Figure 1:
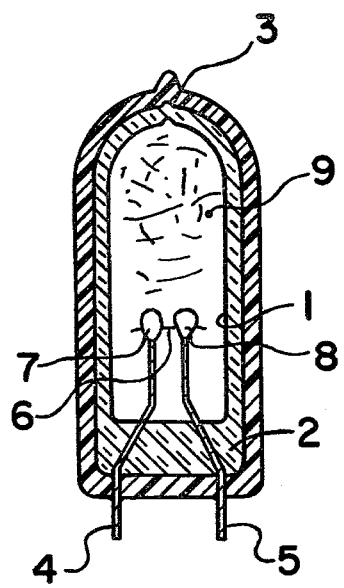

United States Patent [19]  
Fonda et al.

[11] 4,198,200  
[45] Apr. 15, 1980

[54] DAMAGE-PREVENTIVE COATINGS

[75] Inventors: James B. Fonda; Howard B. Swanson, Jr., both of Erie; Dennis D. Howard, Girard, all of Pa.

[73] Assignee: Lord Corporation, Erie, Pa.

[21] Appl. No.: 907,084

[22] Filed: May 18, 1978

[51] Int. Cl.² .............................. C08L 75/00
[52] U.S. Cl. .......................... 431/360; 525/440; 525/455; 525/920; 428/425.6
[58] Field of Search .............. 431/360; 260/859 R; 525/440, 455, 920

[56] References Cited

U.S. PATENT DOCUMENTS

| | | | |
|---|---|---|---|
| 3,509,234 | 4/1970 | Burlant | 260/859 R |
| 3,678,014 | 7/1972 | Suzuki | 260/859 R |
| 3,925,335 | 12/1975 | Kuehn | 260/859 R |
| 3,975,457 | 8/1976 | Chang | 260/859 R |
| 3,992,136 | 11/1976 | Shaffer | 431/360 |
| 4,034,017 | 7/1977 | Chang | 260/859 R |
| 4,045,156 | 8/1977 | Chu | 431/360 |
| 4,057,431 | 11/1977 | Finelli | 260/859 R |
| 4,065,587 | 12/1977 | Ting | 260/859 R |
| 4,076,489 | 2/1978 | Schroeter | 427/106 |
| 4,082,634 | 4/1978 | Chang | 204/159.15 |
| 4,112,017 | 9/1978 | Howard | 260/859 R |
| 4,116,786 | 9/1978 | Hodakowski | 260/859 R |
| 4,129,709 | 12/1978 | Lorenz | 526/264 |
| 4,133,723 | 1/1979 | Howard | 204/15 |

Primary Examiner—Paul Lieberman  
Attorney, Agent, or Firm—John A. Gazewood

[57] ABSTRACT

Thermosetting addition-polymerizable unsaturated urethane or urea compositions have been developed which are especially suited for use as damage-preventive coatings for wood, metal, glass, ceramic, and plastic structures. The use of the coatings as containment vessels for photoflash lamps is described.

8 Claims, 2 Drawing Figures

DAMAGE-PREVENTIVE COATINGS

This invention relates to radiation-curable coating compositions. More particularly, the invention relates to addition-polymerizable modified urethane and urea coatings especially adapted for use as damage-preventive containment coatings.

It is well known to employ organic coating compositions to prevent damage to glass, plastic, metal, and other objects, including bottles, cans, glasses, ornamental objects and the like. A variety of such coatings have been proposed for use as damage-preventive coatings, with the ultimate selection being a function of the use conditions as well as economics. Unfortunately, there is no one composition which will suffice as a damage-preventive coating for all applications. In many instances, the coatings must be multifunctional, for example, where the article to be protected is made of glass, the coating must not only protect the article but also must prevent glass fragments from flying about and causing lacerative injuries to bystanders, and in addition, provide good optical characteristics such as transparency and light transmission as well as maintain the damage-preventive capability regardless of environmental conditions.

An exemplary application is photoflash lamps. As is known, a typical photoflash lamp comprises a hermetically sealed glass envelope, a quantity of combustible material located in the envelope, such as zirconium or hafnium foil, and a combustion-supporting gas, such as oxygen, at a pressure well above one atmosphere. The lamp also includes an electrically or percussively activated primer for igniting the combustible material to flash the lamp. During lamp flashing, the glass envelope is subject to severe thermal shock due to hot particles of metal oxide impinging on the walls of the lamp, resulting in cracks and crazes in the glass which greatly weaken the envelope. To protect the public from flying broken glass fragments, it has been common practice to reinforce the glass envelope and improve its containment capability by applying a protective coating of cellulose acetate lacquer on the lamp envelope by means of a dip process. In the typical dip process, a large number of envelopes are loaded onto a rack and then sequentially dipped in the cellulose acetate lacuer and oven-dried a sufficient number of times to build up the desired coating thickness. The process is time-consuming, generally requires a large area of production floor space and involves considerable hand labor, all of which add significantly to manufacturing costs. The solvent, generally comprising acetone, is highly flammabl and introduces a high risk of fire by igniting of vapors in either the dip bath or drying oven. Injuries to personnel, equipment downtime, and consumption of fire extinguishing chemicals resulting from solvent fires further add to the manufacturing costs.

Over the years, there have been developed higher performance flashlamps which contain higher combustible fill weights per unit of envelope internal volume along with higher gas fill pressure. These higher performance flashlamps, especially in combination with hotter burning combustible materials such as hafnium, when flashed appear to subject the glass envelopes to more intense thermal shock effects, and thus, require stronger containment vessels. It has been proposed to meet the need by employing a hard glass envelope, such as the borosilicate glass disclosed in U.S. Pat. No. 3,506,385, in combination with a damage-preventive dip coating. Such hard glass envelopes do improve containment capability of the glass envelope itself. They are also significantly more expensive than the commonly used soft glass due to both increased material costs and the need for special lead-in wires to provide sealing compatibility with the hard glass envelope. Though more resistant to thermal shock than soft glass structures, hard glass envelopes also exhibit cracks and crazing upon lamp flashing, especially at high internal fill pressures which approach or exceed 20 atmospheres, and thus, do not obviate the need for a protective coating.

Although cellulose acetate lacquers can still be employed as damage-preventive coatings for hard glass envelopes, the thicker coatings required to contain the higher pressure explosions not only increases manufacturing costs but can adversely affect optics. It has been proposed to substitute other film-forming materials for cellulose acetate in the lacquer systems to obtain stronger and more heat resistant exterior envelope coating, including acrylic and substituted acrylic homopolymer and copolymer resins of both thermoplastic and thermosetting types, silicone resins, cellulosic resins and thermosetting cellulosic resins, water-soluble polymers, vinyl resins, styrene copolymers, alkyd and polyester resins, melamine resins, urea formaldehyde resins, epoxy resins, polyurethanes, polyisobutylene resins, butadiene copolymers, polyamides, and polycarbonate resins. Generally, these materials had been employed as damage-preventive coatings in less demanding applications. Generally, with the exception of polycarbonate resins, due to insufficient impact strength, tensile strength, heat distortion temperature or any combination of such deficiencies, or for a lack of consistency of mechanical, thermal and optical properties under all conditions of temperature, humidity or temperature and humidity, the referenced materials were generally less satisfactory than cellulose acetate, which remains the dominant damage-preventive coating for photoflash lamps.

A particular drawback to many of the alternatives for cellulose acetate in the dipping lacquer is the failure of the alternate material to deposit optically clear coatings from the dipping lacquers. For example, while polycarbonate coatings, which have a higher impact strength and higher softening temperature than cellulose acetate coatings, can provide a stronger containment vessel than cellulose acetate, the use of the conventional dipping and drying process to apply the polycarbonate coating results in a relatively cloudy coating. Transparent coatings can be obtained by maintaining an extremely low humidity in the drying ovens, but this procedure involves a prohibitively expensive drying operation. However, many of the proposed alternative materials exhibit properties which are superior to cellulose acetate, such as higher impact strength, higher tensive strength and higher softening temperature, and make them attractive candidates for damage-preventive coatings. To take advantage of these seemingly beneficial properties and at the same time to overcome the inherent disadvantages of dipping lacquers, it has been proposed to vacuum-form thermoplastic coatings, such as polycarbonate, acrylic and substituted arylic polymers, acrylonitrile-butadiene-styrene resins, ionomers, poly(-methylpentene), polyamides, polystyrene, polysufone, and including cellulose acetate onto the exterior surface of the glass envelope. The method includes the steps of placing the glass envelope within a preformed sleeve of thermoplastic material; drawing a vacuum in the annular area between the sleeve and envelope, and simultaneously heating the assembly incrementally along its length. The process is said to provide optically clear protective coatings by means of a faster, safer, and more economical process than the dipping lacquers and to permit the use of stronger, more temperature resistant thermoplastics.

While offering several advantages, the vacuum-formed protective coatings are not without fault. Generally, the thermoplastic materials have a higher coefficient of thermal expansion than the glass envelope and tend to contract more than the glass. The differential rate of contraction often results in an unequal distribution of stresses throughout the coating leading to poor product performance. U.S. Pat. No. 3,832,257 discloses a method for stress-relieving the vacuum-formed coatings; however, the stress-relieved coatings tend to crack and fail under conditions of high humidity, even when the remaining stresses are within the design limits for the thermoplastic resin used. It has also been proposed to incorporate compatible plasticizers into the thermoplastic resin in the expectation that the plasticizer could aid in relieving the stresses caused by differential contraction of glass and thermoplastic resin. While effective in some respects, introduction of plasticizer resulted in substantial weakening of the coatings. Thus, the vacuum-formed plasticized thermoplastic coatings were not consistently better than cellulose acetate lacquer coatings in containment tests with overcharged photoflash test lamps. In addition, the low set point and poor strength at elevated temperatures of the plasticized thermoplastics made extraction of the injection molded sleeves from the mold a difficult, slow, and uneconomical process. It has also been proposed to employ an alkali-barrier coating disposed between the glass envelope and the vacuum-formed thermoplastic coating. While the barrier coating concept does result in an improvement in humidity resistance, it does not overcome the other problems associated with vacuum-formed thermoplastic containment coatings.

Notwithstanding the various proposals directed to its replacement, cellulose acetate remains the dominant material in use and is the exemplar by which all other containment coatings for flashlamps are judged. The cellulose acetate coatings are still applied as a lacquer by dip coating. Generally, the lacquers comprise 10-20 weight percent cellulose acetate in acetone. The lacquers are costly, provide environmental problems with respect to disposal of solvent vapors, require a length application period and are fire hazards as well as hazardous to health. Additionally, the cellulose lacquer systems exhibit a reduced containment capability with respect to the high performance flashlamps. There remains a need for improved containment coatings, not only for flashlamps, but also in other application areas where glass shards constitute a safety hazard, such as in bottles, pressurized vessels such as aerosol containers, ornamental glass objects, and the like.

The containment problem is quite complex, and although it is well recognized, unfortunately it is not well understood. It is equally unfortunate that, while it may be possible to ascertain the properties of one system, such as cellulose acetate, that are required for good containment, duplication of the identical properties in systems based on other materials may not be possible or will not necessarily provide equivalent results. In other words, the knowledge of what makes a particular system a good containment coating does not ensure that a different coating having those same properties will be a good containment coating. Thus, the search for containment coatings continues to be one that, with present knowledge, is best solved by trial-and-error empirical means.

In accordance with the present invention, there have been discovered addition-polymerizable thermosetting coating compositions which exhibit a containment capability generally superior to cellulose acetate containment coatings, which are optically clear and do not otherwise interfere with light transmission through the coating, and when used as containment vessels for photoflash lamps, do not appreciably diminish the lamp output through excessive charring, burning, or thermal discoloration of the exterior coating. Additionally, such thermal breakdown as may occur does not result in the evolution of disagreeable smoke or odors, as is the case with other coatings, including cellulose acetate, especially in the case of high performance photoflash lamps. The coatings of the invention are effective to contain glass fragments resulting from the breaking of glass structures, such as photoflash lamps, ornamental objects such as Christmas ornaments, bottles, glasses, aerosol containers, and plate glass, such as automobile glass, sliding doors and display windows.

The invention further provides an improved photoflash lamp comprising an hermetically-sealed glass envelope, a combustion-supporting gas in said envelope, a quantity of combustible material located in said envelope, ignition means attached to said enveloped and disposed in operative relationship to said combustible material, and as a damage-preventive containment coating on the exterior wall of said envelope, an addition-polymerizable thermoset coating prepared according to the concepts of this invention.

The ability of the herein-described coating compositions to provide an improvement in containment strength is not understood and is unequivocally surprising from a number of aspects. The addition-polymerization of the polymer-reactive monomer compositions results in a thermoset coating characterized by a three-dimensional lattice network in contrast to the essentially two-dimensional linear network characteristic of thermoplastics. The present coatings provide containment even though their softening temperature is generally below that of cellulose acetate, in constrast to previous concepts that softening temperature should be at least no lower, and preferably are higher, than that of cellulose acetate.

Figure 2:
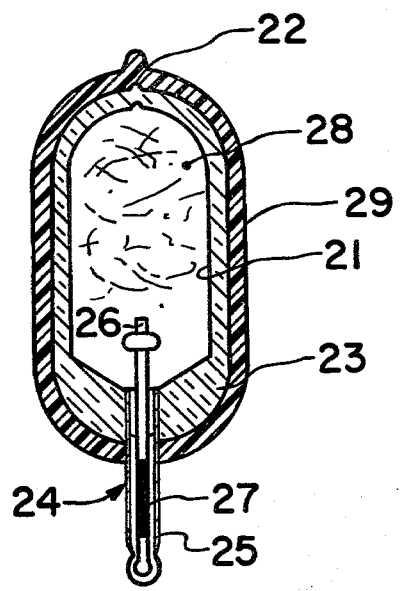

A full understanding of the invention will be obtained from a study of this specification and the accompany drawings, in which:

FIG. 1 is an enlarged sectional elevation of an electrically ignitable photoflash lamp having a protective coating in accordance with the invention, and FIG. 2 is an enlarged sectional elevation of a percussive-type photoflash lamp having a protective coating in accordance with the invention.

Referring to FIG. 1, the electrically ignitable lamp comprises a hermetically-sealed envelope 1 of glass tubing having a press 2 defining one end thereof and an exhaust tip 3 defining the other end thereof. Supported by the press 2 is an ignition means comprising a pair of lead-in wipes 4 and 5 extending through and sealed into the press. A filament 6 spans the inner ends of the lead-in wires, and beads of primer 7 and 8 are located on the inner ends of lead-in wipes 4 and 5, respectively, at their juncture with filament 6. Typically, the lamp envelope 1 has an internal diameter of less than 1.5 cm and an internal volume of less than 1 cc, although the invention is applicable to any lamp regardless of size. A combustion-supporting gas, such as oxygen, and a filamentary combustible material 9 such as shredded zironium of hafnium foil are disposed within the lamp envelope. Typically, the combustion-supporting gas is at a pressure exceeding one atmosphere, with the newer high performance flashlamps have oxygen fill pressures of 12 to 15 atmospheres or more. As will be described in more detail hereinafter, the glass envelope 1 is reinforced in accordance with this invention by an addition-polymerized thermoset coating 10 on its exterior surface.

The percussive-photoflash lamp illustrated in FIG. 2 comprises a length of glass tubing defining a hermetically-sealed lamp envelope 21 constricted at one end to define an exhaust tip 22 and shaped to defined a seal 23 about a primer 24 at the other end thereof. The primer 24 comprises a metal tube 25, a wire anvil 26, and a charge of fulminating material 27. A combustible 28, auch as filamentary zirconium or hafnium, and a combustion-supporting gas, such as oxygen, are disposed within the lamp envelope, with the fill gas being at a pressure greater than one atmosphere. As in FIG. 1, the glass envelope 21 is reinforced in accordance with the invention by an addition-polymerized thermoset coatng 29 on its exterior surface.

Although photoflash lamps of FIG. 1 and FIG. 2 are ignited by different means, the lamps are similar in that in each, the ignition means is attached to one end of the glass envelope and disposed in operative relationship with respect to the combustible material. For example, the filament 6 of the flash lamp of FIG. 1 is incandescenced electrically, by current flowing through leads 4 and 5, to ignite the beads of primers 7 and 8 which are then operative to ignite the combustible material 9 disposed within the glass envelope 1. The flashlamp of FIG. 2 is activated by an impact onto tube 25, causing deflagration of fulminating material 27, which results in ignition of the combustible material 28 disposed within the glass envelope 21. The invention is applicable to photoflash lamps regardless of ignition means.

In accordance with the present invention, we have discovered certain inert solvent-free thermosetting coating compositions adapted for use as containment reinforcing coatings for glass structures. More particularly, the thermosetting damage-preventive coatng compositions of the invention are 100 percent reactive systems, that is, all the components react during curing to become an integral part of the cured coating, comprising:

(a) At least one addition-polymerizable unsaturated resin selected from the group consisting of urethane and urea resins which are characterized by the presence of at least one ethylenically unsaturated unit having the structure —C═C— and a residual isocyanate reactivity not exceeding one percent by weight, based on total weight of such unsaturated resin, said unsaturated resins comprising the reaction product of:
(i) at least one organic isocyanate compound characterized by the presence of at least two reactive isocyanate groups:
(ii) from about 30 to 100 mol percent of at least one polymeric material characterized by the presence of at least two active hydrogen groups selected from —OH, —NH— and —NH$_2$, and mixtures thereof,
(iii) from about 20 to 0 mol percent of at least one monomeric chain-extending compound having two active hydrogen groups selected from —OH, —NH—, and —NH$_2$, including mixtures thereof;
(iv) from about 10 to 0 mol percent of at least one monomeric chain-extending compound having at least three active hydrogen groups selected from —OH, —NH—, and —NH$_2$, including mixtures thereof;
(v) at least one addition-polymerizable unsaturated monomeric compound having a single isocyanate-reactive active-hydrogen group selected from —OH, —NH— and —NH$_2$, and optionally,
(vi) at least one monomeric chain-terminating agent characterized by the presence of a signle isocyanate-reactive active group selected from —OH, —NH—, and —NH$_2$.

The mol percents of (ii), (iii), and (iv) being based on total mols of polymeric materials and monomeric chain-extending compounds having the recited number of active hydrogen groups;

said isocyanate compound being present in an amount sufficient to provide an NCO: active hydrogen group ratio greater than 1:1, with respect to the active hydrogen groups of (ii), (iii), and (iv);

said addition-polymerizable unsaturated monomeric compound (v) being present in an amount sufficient to provide at least one molar equivalent of active hydrogen group with respect to available free isocyanate moiety;

said chain-terminating agent (vi) being present in an amount sufficient to reduce the amount of residual isocyanate moiety of said unsaturated resin to below one weight percent, based on total weight of such resin, and (b) A reactive diluent system comprising at least one addition-polymerizable unsaturated monomeric compound which is copolymerizable with said unsaturated resin.

The unsaturated resins which are employed in the practice of the present invention can be broadly described as being selected from the class consisting of unsaturated urethane and urea resins. More particularly, such unsaturated urethane and urea resins comprise the reaction product of at least two reactive isocyanate moieties; at least one polymeric material having at least two active hydrogen groups selected from —OH, —NH—, and —NH$_2$, including mixtures thereof; optionally, and preferably, at least one monomeric chain-extending compound having two active hydrogen groups selected from —OH, —NH—, and —NH$_2$, including mixtures thereof; optionally, at least one monomeric chain-extending compound having at least three active hydrogen group selected from —OH, —NH— and —NH$_2$, including mixtures thereof; at least one monomeric ethylenically unsaturated compound having a single isocyanate-reactive active hydrogen group selected from —OH, —NH—, and —NH$_2$; and at least one chain-terminating agent having a single isocyanate-reactive active hydrogen group selected from —OH, —NH—, and NH$_2$.

Unsaturated urethane and urea resins suitable for use in the practice of the invention are characterized by the presence of at least one, preferably at least two, addition-polymerizable ethyenically unsaturated unit(s) having the structure —C═C— and the presence of not more than one percent by weight of residual reactive isocyanate moieties based on total weight of resin. Preferably, the resin is substantially devoid of such residual isocyanate moieties. The polymerizable ethylenically unsaturated unit is preferably a terminal vinyl group having the structure $CH_2=C-$. The resins are further characterized in that the polymerizable ethylenically unsaturated unit is separated from the main or backbone carbon-carbon chain by at least one, preferably at least two, urethane or urea group(s) or combination of such groups. The resins are further characterized by a molecular weight of at least 1,200, preferably 1,500 to 6,000; and the presence of from about 0.5 to about 3 ethylenically unsaturated units per 1,000 units of molecular weight. Especially preferred are the acrylated urethane and urea resins, that is, unsaturated urethane and urea resins containing a polymerizable acrylyl, methacrylyl, acrylamide, methacrylamide, and the like, moiety in the resin molecule, characterized by the presence of at least one, preferably at least two, terminal ethylenically unsaturated unit(s) having the structure $CH_2=C-$, and not more than one, preferably essentially zero, percent by weight of residual free isocyanate moieties, based on total weight of the resins. Currently preferred resins are the true urethanes, that is, the active hydrogen group-containing polymeric and monomeric precursors are hydroxylated, with especially preferred resins comprising the reaction product of at least one diisocyanate, at least one polymeric diol, at least one monomeric diol, at least one monomeric ethylenically unsaturated compound having a single isocyanate-reactive hydroxyl group and a saturated monoalcohol having from one to four carbon atoms.

Unsaturated urethane resins are well known in the art. Such resins comprise the reaction product of at least one organic isocyanate having at least two isocyanate groups, at least one monomeric or polymeric organic compound characterized by the presence of at least two isocyanate-reactive active hydrogen groups, and at least one unsaturated addition-polymerizable monomeric organic compound having a single isocyanate-reactive active hydrogen group, there being an excess of organic isocyanate compound with respect to said organic compounds containing at least two isocyanate-reactive active hydrogen groups. Unsaturated urethane resins can be prepared by several known reaction routes, with the method wherein an isocyanate-functional prepolymer, obtained by reacting an excess of organic isocyanate having at least two isocyanate groups with organic compounds having at least two active hydrogen groups, is reacted with an appropriate unsaturated addition-polymerizable monomeric compound having a single isocyanate-reactive active hydrogen group, such as 2-hydroxyethyl acrylate, being presently preferred. The various methods of preparing unsaturated urethane resins and prepolymer precursors are sufficiently well known as to require no further elaboration herein. The unsaturated urethane resins of this invention can be prepared by any of the known methods, with such resins prepared through the route of isocyanate-functional prepolymers being especially preferred.

Organic isocyanate compounds suitable for use in forming unsaturated urethane and urea resins in accordance with the invention can be any organic isocyanate compound having at least two reactive isocyanate groups. Included within the purview of such isocyanate compounds are aliphatic, cycloaliphatic, and aromatic polyisocyanates as these terms are generally interpreted in the art. Thus, it will be appreciated that any of the known polyisocyanates such as alkyl and alkylene polyisocyanates, cycloalkyl and cycloalkylene polyisocyanates, and aryl and arylene polyisocyanates, including variants thereof, such as alkylene cycloalkylene and alkylene arylene polyisocyanates, can be employed. Suitable polyisocyanates include, without limitation, tolylene-2, 4-diisocyanate, 2,2,4-trimethylhexamethylene-1,6-diisocyanate, hexamethylene-1,6-diisocyanate, diphenylmethane-4,4'-diisocyanate, triphenylmethane-4,4',4"-triisocyanate, polymethane poly (phenyl isocyanate), m-phenylene diisocyanate, 2,6-tolylene diisocyanate, 1,5-naphthalene diisocyanate, naphthalene-1,4-diisocyanate, diphenylene-4,4'-diisocyanate, 3,3'-bitolylene-4,4'-diisocyanate, 1,4-cyclohexylene dimethylene diisocyanate, xylene-1,4-diisocyanate, cyclohexyl-1,4-diisocyanate, 4,4'-methylene-bis-(cyclohexyl diisocyanate) 3,3'-diphenyl methane-4,4'-diisocyanate, isophorone diisocyanate, dimer isocyanates such as the dimer of tolylene diisocyanate, and the product obtained by reacting trimethylol propane and 2,4-tolylene diisocyanate in a molar ratio of 1:3. Currently, aliphatic and cycloaliphatic diisocyanates are preferred.

The active hydrogen-containing materials which are employed in preparing unsaturated urethane and urea resins in accordance with the invention can be linear or branched or mixtures thereof and include materials having at least one active hydrogen per molecule as determined by the Zerewitinoff method; however, the active hydrogen group must be selected from hydroxyl, primary amine and secondary amine including mixtures of such groups. We have found that containment coatings obtained from active hydrogen-containing precursor materials having active hydrogen groups selected from hydroxyl, primary amine, secondary amine, and mixtures of such groups are especially effective to meet the minimum requirements for such coatings of (1) containment capability, (2) shelf or storage stability, and (3) transmission at least equivalent to cellulose acetate lacquer. Other active hydrogen groups are deficient in one or more respects. For example, containment coatings prepared from precursors having a mercaptan active hydrogen group evidence the required containment capability and acceptable storage stability but tend to absorb, rather than transmit light, and evolve a highly undesirable odor upon thermal breakdown.

More particularly, the active hydrogen-containing materials employed in the practice of the invention include, as required materials, (1) polymeric compounds having at least two isocyanate-reactive active hydrogen groups as previously specified and (2) addition-polymerizable monomeric compounds having a single ethylenically unsaturated unit and a single isocyanate-reactive active hydrogen group as previously specified, and as optional materials, (3) monomeric chain extending agents having at least two isocyanate-reactive active hydrogen groups as previously specified, and (4) monomeric chain terminating agents having a single isocyanate-reactive active hydrogen group as previously specified.

Essentially any polymeric material having two or more isocyanatereactive active hydrogen groups selected from hydroxyl, primary amine, secondary amine and mixtures of such groups, can be employed in the practice of this invention. Such polymeric compounds are well known and need not be discussed here in any detail. Suitable active hydrogen-containing polymeric compounds include polyethers such as polyethylene glycol, polypropylene glycol and polytetramethylene glyol; hydroxy-terminated polyalkylene esters of aliphatic, cycloaliphatic and aromatic diacids; esters of polyhydric alcohols and hydroxy fatty acids; alkyd resins containing hydroxyl end groups; polyamine and polyester amide resins; hydroxyl-terminated polybutadiene resins; hydroxylated acrylic and substituted acrylic resins, hydroxyl-terminated vinyl resins, and polycaprolactones. Generally, polymeric materials having two active hydrogen groups are preferred.

Suitable addition-polymerizable monomeric compounds having a single ethylenically unsaturated unit and a single isocyanate-reactive hydroxyl active hydrogen group which can be used in the practice of this invention include 2-hydroxyethyl acrylate, 3-hydroxypropyl acrylate, 4-hydroxybutyl acrylate, 8-hydroxyoctyl acrylate, 12-hydroxydodecanyl acrylate, 6-hydroxyhexyl oleate, hydroxy neopentyl acrylate, hydroxyneopentyl linoleate hydroxyethyl-3-cinnamyloyloxypropyl acrylate, hydroxyethyl vinyl ether, and the corresponding methacrylates, and allyl alcohol.

Although not a required element, it has been found advantageous to employ one or more monomeric chain extending agents or compounds having two or more isocyanate-reactive active hydrogen groups selected from hydroxyl, primary amine and secondary amine in preparing unsaturated urethane or urea resins in accordance with the invention. The chain extenders should have molecular weights of less than 250, preferably in the range from 50 to 225. Preferred chain extenders are aliphatic diols free of alkyl substitution and aliphatic triols containing from 2 to 15 carbon atoms. Representative chain extending compounds include ethylene glycol, 1,3-propane diol, 1,4-butanediol, 1,6-hexanediol, trimethylol propane, triethylene glycol, trimethylol propane, glycerol, 1,2-ethylene diamine, 1,8-methane diamine, isophorone diamine, propane-2,2-cyclohexyl amine, methane-bis(4-cyclohexyl amine), N,N'-dimethyl-o-phenylene diamine, monoethanolamine.

The optional, but also preferred chain terminating agents can be any of such materials having the recited active-hydrogen groups which have been employed in the art to terminate reactions of isocyanate moieties. These materials are preferably included during the preparation of the unsaturated urethane and urea resins of this invention. Representative chain terminating agents include monoalcohols and monoamines, preferably having 1 to 4 carbon atoms, and morpholine.

The unsaturated urethane and urea resins can be prepared by any of several reaction routes. For example, the isocyanate compound, the polymeric compound having at least two active hydrogen groups, the addition-polymerizable monomeric compound having a single ethylenically unsaturated unit and a single active hydrogen group, and in a particularly preferred embodiments, the chain extending and chain terminating agents, can be simultaneously reacted together. Currently, it is preferred to form the unsaturated resins in two or more steps comprising (1) reacting the isocyanate-compound and polymeric compound to provide an isocyanate-functional prepolymer and (2) reacting the prepolymer with the addition-polymerizable monomeric compound. In this preferred method, the chain extending agent is preferably added subsequent to the reaction between the prepolymer and addition-polymerizable ethylenically unsaturated compound to ensure termination of the reaction at the desired stage of viscosity, which will generally correspond to a molecular weight of at least 1,200, preferably 1,500 to 6,000, which is usually a function of an end use coating requirement. Regardless of the process employed, it is preferred to conduct the entire overall reaction in the presence of a diluent phase which is copolymerizable with the unsaturated resin product but is inert with respect to the manufacture of the resin. It will be appreciated that some degree of experimentation may be necessary in selecting appropriate starting materials, reaction conditions, and in ascertaining the relationship, including relative amounts, of the various ingredients. In the general case, the use of chain-extending agent is preferred with low (up to 1,000) molecular weight polymeric active hydrogen-containing compounds; however, too large an amount of chain-extending agent can increase the density of urethane and urea groups and adversely affect containment properties. Caution should also be exercised in the amount of chain-terminating agent, particularly if these materials are included in the initial charge, to mitigate against premature termination of the reaction. Thus, it is generally advisable to add chain-terminating compounds at a point when the capping reaction between the active hydrogen group of the addition-polymerizable ethylenically unsaturated monomer and free isocyanate moieties is sufficient to afford an unsaturated urethane or urea resin having from about 0.5 to about 3 ethylenically unsaturated units per 1,000 units of molecular weight of such resin. Overall, the amount of isocyanate compound should be sufficient to provide an NCO:OH ratio of at least 1.05:1, with the ratio preferably being from 1.05–2.0:1, especially 1.4–1.8:1, when the active hydrogen-containing material(s) and isocyanate compound have the functionalities of 2; and preferably at least 2:1, especially 2.3–5:1, when any active hydrogen-containing material or isocyanate compound has a functionality greater than 2, the NCO:OH ratio being based on total available free active isocyanate and isocyanate-reactive active hydrogen groups. The total active hydrogen values of polymeric material, chain-extending agent, addition-polymerizable ethylenically unsaturated monomer and chain-terminating agent should be such that the residual isocyanate content of the unsaturated resin product is not greater than one weight percent and preferably is below 0.1 weight percent. We have discovered that discoloration of the cured coatings can be substantially eliminated if residual reactive isocyanate values of the unsaturated urethane and urea resins are reduced to below 0.1 weight percent.

Reactive diluent systems which can be employed in the addition-polymerizable compositions of this invention include any of such systems which have been or are being used for this purpose. Broadly, suitable reactive diluent systems comprise at least one unsaturated addition-polymerizable monomer which is copolymerizable with the unsaturated resin. The reactive diluent can be monofunctional or polyfunctional. A single polyfunctional diluent can be used, as can mixtures thereof, or a combination of one or more monofunctional reactive diluents and one or more polyfunctional reactive diluents can be used. Such combinations of mono- and polyfunctional reactive diluents are currently preferred. Generally, the reactive diluent system will comprise from about 10 to about 75, preferably about 25 to about 50, weight percent, based on total weight of unsaturated resin and reactive diluent, of the addition-polymerizable compositions of the invention. Particularly preferred reactive diluents are unsaturated addition-polymerizable monofunctional monomeric compounds selected from the group consisting of esters having the general formula

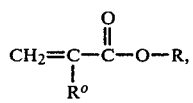

wherein R° is hydrogen or methyl and R is an aliphatic or cycloaliphatic, preferably alkyl or cycloalkyl, group having from 6 to 18, preferably 6 to 9 carbon atoms. Representative of such preferred reactive monomeric diluents, without limitation thereto, are hexyl acrylate, cyclohexyl acrylate, 2-ethylhexyl acrylate, octyl acrylate, nonyl acrylate, stearyl acrylate, and the corresponding methacrylates. Illustrative of other reactive monofunctonal and polyfunctional monomeric diluents which can be employed are styrene, methyl methacrylate, butyl acrylate, isobutyl acrylate, 2-phenoxy acrylate, ethoxyethoxyethyl acrylate, 2-methoxyethyl acrylate, 2-(N,N'-diethylamino)-ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri, or tetra-acrylate, the corresponding methacrylates, vinyl pyrrolidone, and the like. Reactive diluent systems are well known to those skilled in the art of radiation curing and the selection of an appropriate diluent system in any given instance is sufficiently encompassed by such knowledge as to require no further discussion here.

In a particularly preferred embodiment, the reactive diluent system contains from 10 to 100 percent by weight, based on weight of diluent system of N-vinyl-2-pyrollidone and zero to 90 percent by weight of the above-described preferred diluent esters. While this compound has been suggested as being suitable for use in reactive diluents, it has been considered to be, at best, merely equivalent to other unsaturated monomers. We have discovered that N-vinyl-2-pyrrolidone provides coatings having a containment capability which is unmatched by coating formed from formulations which do not contain any N-vinyl-2-pyrrolidone.

The herein-described coating compositions can be cured to a thermoset state by any mechanism which is effective to initiate addition polymerization reactions. For example, the compositions can be cured at room temperature by the use of redox couple catalyst systems which can produce free radicals effective to initiate the addition polymerization reaction; they can be cured at elevated temperatures employing free radical generators such as the diacyl peroxides; they can be cured by exposure to high energy radiation sources such as electron beam and other ionizing radiation sources and they can be cured by exposure to low energy sources such as ultraviolet light. Currently, this latter method of curing is preferred. When cure is effected by exposure to such low energy sources, a photo initiator which can produce free radicals is required. Any of the known photo initiators can be used at concentration levels normally employed in the art. Illustrative photo initiators, without limitation thereto, include benzophenone, benzoin, acetophenone, benzoin methyl ether, Michler's ketone, benzoin butyl ether, propiophenone, fluorenone, carbazole, diethexyacetophenone, the 2-, 3-, and 4-methylacetophenones and methoxyacetophenones, 2-acetyl-4-methylphenyl acetate, 2,2'-dimethoxy-2-phenylacetophenone, benzaldehyde, fluorene, anthroquinone, triphenylamine, 3- and 4-allylacetophenone, p-diacetylbenzene, and the like, and mixtures thereof.

The invention compositions can also include pigments, fillers, wetting agents, flatting agents, flow control agents, and other additives typically present in coating compositions. In some applications, the inclusion of minor amounts of inert solvents can be advantageous. Such additive materials are well known to those skilled in the art and do not require further elaboration herein. Also well known are the concentrations at which such additives are used.

The addition-polymerizable compositions of this invention are characterized by improved flowability, fluidity, and physical stability. The compositions of this invention can be applied to glass, wood, metal, ceramic, and plastic substrates in an economical and efficient manner using conventional industrial techniques and provide smooth, uniform films which are rapidly cured to dried films having excellent physical and chemical properties, including a plastic yield point of at least 6 megapascals, preferably at least 7.5 magapascals, measured according to the test method of ASTM D-2370-68, based on apparatus manufactured by the Instron Engineering Corporation, Canton, Massachusetts, at an instrument crosshead speed of 2.57 cm/min.

The improved containment coating compositions can be applied and cured by any of the conventional known methods. Application can be by spraying, dipping, metering dispenser, roll coating, curtain coating or any other procedure. It is a particular feature of the invention that the applied coatings can be cured at ambient temperatures utilizing redox couple catalyst systems; at moderately elevated temperatures using free radical generators; and in either inert or oxygen-containing atmospheres at ambient temperatures employing either low energy actinic radiation or high energy ionizing radiation sources.

The invention is illustrated in greater detail by the following examples, but these examples are not to be construed as limiting the present invention. All parts, percentages, and the like are in parts by weight, unless otherwise indicated.

EXAMPLE I

An unsaturated resin is prepared by reacting 1 mol polycaprolactone diol, 4 mols 1.4-butane diol and 6 mools isophorone diiocyanate in 2 -ethylhexyl acrylate. The resulting isocyanate-functional oligomer is contacted with 2.2 mols hydroxyethyl acrylate to afford a fully capped addition-polymerizable unsaturated resin having a molecular weight ca. 2,700 and approximately 0.93 units of vinyl unsaturation per 1,000 units of molecular weight and a residual free isocyanate value below 0.1 wt. %. A coating composition is prepared as follows:

| INGREDIENT | PARTS BY WEIGHT |
|---|---|
| Addition-Polymerizable Unsaturated Resin | 56.9 |
| 2-Ethylhexyl Acrylate | 24.4 |
| N-Vinyl-2-Pyrollidone | 17.7 |
| Diethoxyacetophenone | 1.0 |

The composition is dip coated onto photoflash lamp test bulbs to provide a wet film thickness of 20 mils. The coating is cured by exposure for 45 seconds in (i) air and (ii) nitrogen atmospheres to low intensity ultraviolet light at wavelengths of (iii) 310 and (iv) 355 nanometers. After aging for 24 hours, comparative testing of the coatings prepared in accordance with this invention, cellulose acetate lacquer coatings and polycarbonate sleeve coatings provide the following results:

| COATING | PERCENT CONTAINMENT | |
| --- | --- | --- |
|  | $TC^a$,% | $PONC^b$,% |
| Invention $AS^c$ | 75 | 3 |
| Invention $NS^d$ | 70 | 13 |
| Invention $AL^e$ | 75 | 11 |
| Invention $NL^f$ | 69 | 31 |
| Cellulose Acetate Lacquer | 70 | 0 |
| Vacuum-Formed Polycarbonate Sleeve | 54 | 2 |

$^a$Percentage of bulbs with total containment.
$^b$"Puff-out non-containers," percentage of bulbs with minimum fragmentation, and non-violent fragmenting.
$^c$Invention coating, cured in air at 310 nm.
$^d$Invention coating, cured in nitrogen at 310 nm.
$^e$Invention coating, cured in air at 355 nm.
$^f$Invention coating, cured in nitrogen at 355 nm.

The test photoflash lamps employed in the comparative testing are cellophane-doped to provide an overpressurized condition at flash, which results in a more violent than normal explosion. Containment failure with cellulose acetate lacquer-coated bulbs is extremely violet, shattering the bulb and driving broken glass fragments with greate velocity away from the bulb. Containment failure of bulbs having containment coatings according to the invention is significantly less violet, broken glass is driven from the bulb with noticeably less velocity, and in PONC failure, the explosion appears to be cushioned in some unknown manner with the result that there is a minimum fragmentation.

The data clearly demonstrate superiority of the invention coatings as containment vessels for glass objects. The data further show that improved containment of actinic radiation-cured coatings is better in an oxygen-rich environment and better when cure is effected at a higher wavelength.

EXAMPLE II

Films of the coating composition of Example I and cellulose acetate lacquer (18% resin solids in acetone) are laid down at a thickness of 20 mils. Rheovibron tests of the cured and aged (24 hours) Example I coating and cellulose acetate coating show that cellulose acetate has a higher softening point, 163° C., than the Example I coating, 49° C. This data further demonstrate the surprising capacity of the herein-described coatings as containment vessels for glass objects. Prior to the instant discovery, it has been presumed that a softening temperature at least equal, and preferably superior, to cellulose acetate was required for good containment. Additionally, the film from the Example I coating has a plastic yield point of 8.2 magapascals at an instrument crosshead speed (ASTM D-2370-68) of 2.57 cm/min., c.f. cellulose acetate, plastic yield point 38.7 megapascals.

EXAMPLE III

An unsaturated resin is prepared by reacting 1 mol of polyester polyol (1,3-butylene glycol glycerine/adipic acid/isophthalic acid condensation product) having a hydroxyl functionality of 2.3 and 3.5 mols isophorone diisocyanate in 2-ethylhexyl acrylate diluent. The resulting isocyanate-functional oligomer is fully capped with 2-hydroxyethyl acrylate to afford an addition-polymerizable unsaturated resin having a molecular weight ca. 1,300 and approximately 1.8 units of vinyl unsaturation per 1,000 units of molecular weight. A coating composition is prepared as follows:

| INGREDIENT | PARTS BY WEIGHT |
| --- | --- |
| Addition-Polymerizable Unsaturated Resin | 62.0 |
| 2-Ethylhexyl Acrylate | 15.5 |
| 1,6-Hexanediol Diacrylate | 10.8 |
| Acrylic Acid | 3.9 |
| Acrylamide | 3.9 |
| Diethoxyacetophenone | 3.9 |

The composition is dip coated onto photoflash lamp test bulbs to provide a wet film thickness of 20 mils. The coating is cured by exposure for 90 seconds in a nitrogen atmosphere to low intensity ultraviolet light at a peaked wavelength of 355 nanometers. The cured coating is aged 24 hours before test flashings. Containment capability afforded by the cured unsaturated resin composition was at least equivalent to that afforded by either cellulose acetate lacquer coatings or polycarbonate sleeves.

What is claimed is:

1. A structure comprising a hermetically sealed glass envelope, a combustion-supporting gas in said envelope, ignition means attached to said envelope and disposed in operative relationship to said combustible material, and a protective coating on the exterior surface of said envelope, characterized in that said protective coating comprises an addition-polymerized unsaturated resin composition, further characterized in that said addition-polymerized unsaturated resin composition, prior to curing, comprises an addition-polymerizable admixture comprising:

(a) at least one addition-polymerizable resin selected from the group consisting of unsaturated urethane resin and unsaturated urea resin, such addition-polymerizable resin comprising the reaction product of (i) at least one organic isocyanate compound characterized by the presence of at least two reactive isocyanate groups;

(ii) from 30 to 100 mol percent of at least one polymeric material characterized by the presence of at least two active hydrogen groups selected from hydroxyl, primary amine, secondary amine, and mixtures of such groups;

(iii) from 70 to 0 mol percent of at least one monomeric chain-extending compound having at least two active hydrogen groups selected from hydroxyl, primary amine, secondary amine, and mixtures of such groups; and (iv) at least one addition-polymerizable monomeric compound having a single ethylenically unsaturated unit and a single isocyanate-reactive hydrogen group selected from hydroxyl, primary amine, and secondary amine;

said isocyanate compound (i) being present in an amount sufficient to provide an NCO:active hydrogen group ratio of at least 1.05:1 with respect to the active hydrogen groups of (ii) and (iii);

the mole percents of (ii) and (iii) being based on total mols of polymeric materials and monomeric materials having at least two active hydrogen groups;

said addition-polymerizable monomeric compound (iv) being present in an amount to provide from 0.5 to 3 units of ethylenic unsaturation per 1,000 units of molecular weight of said addition-polymerizable resin; and (b) a reactive diluent system comprising at least one addition-polymerizable unsaturated monomeric compound which is copolymerizable with said addition-polymerizable resin, said reactive diluent system comprising from 10 to 100 percent by weight, based on total weight of diluent system of N-vinyl-2-pyrrolidone.

2. A photoflash lamp according to claim 1 wherein said diluent system comprises from 90 to 0 percent by weight of at least one unsaturated ester having the formula

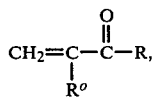

wherein R° is hydrogen or methyl and R is an aliphatic or cycloaliphatic group having from 6 to 18 carbon atoms, based on total weight of diluent system.

3. A photoflash lamp according to claim 2 wherein said isocyanate compound (i) comprises methylene-bis(4-cyclohexyl isocyanate), said polymeric material (ii) comprises 1,3-butylene glycol/glycerol/adipic acid/isophthalic acid polyester, said monomeric chain extending compound (iii) comprises 1,4-butane diol and said addition-polymerizable monomeric compound (iv) comprises 2-hydroxyethyl acrylate.

4. A photoflash lamp according to claim 1 wherein said isocyanate compound (i) comprises polycaprolactone diol, said monomeric chain-extending compound (iii) comprises 1,4-butane diol and said addition-polymerizable monomeric compound (iv) comprises 2-hydroxyethyl acrylate.

5. A photoflash lamp according to claim 2 wherein said isocyanate compound (i) comprises polycaprolactone diol, said monomeric chain-extending compound (iii) comprises 1,4-butane diol and said addition-polymerizable monomeric compound (iv) comprises 2-hydroxyethyl acrylate.

6. A photoflash lamp according to claim 1 wherein said unsaturated resin includes at least monomeric chain terminating having a single isocyanate-reactive active hydrogen group selected from hydroxyl, primary amine and secondary amine, in an amount sufficient to reduce the amount of residual active isocyanate moiety of said unsaturated resin to below one percent by weight, based on total weight of said unsaturated resin.

7. A photoflash lamp according to claim 6 wherein said diluent system comprises from 90 to 0 percent by weight of at least one unsaturated ester having the formula

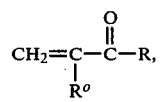

wherein R° is hydrogen or methyl and R is an aliphatic or cycloaliphatic group having from 6 to 18 carbon atoms, based on total weight of diluent system.

8. A photoflash lamp according to claim 7 wherein said isocyanate compound (i) comprises polycaprolactaone diol, said monomeric chain-extending compound (iii) comprises 1,4-butane diol and said addition-polymerizable monomeric compound (iv) comprises 2-hydroxyethyl acrylate.

* * * * *